(12) United States Patent
Brown et al.

(10) Patent No.: US 8,999,287 B2
(45) Date of Patent: Apr. 7, 2015

(54) DEVICE FOR MIXING AND COOLING TWO REACTIVE LIQUIDS AND METHOD OF MAKING PEROXOMONOSULPHURIC ACID WITH THE DEVICE

(71) Applicant: Evonik Degussa GmbH, Essen (DE)

(72) Inventors: Terry Brown, New Orleans, LA (US); Peter Stesel, Hamilton (NZ); Alan Hitchiner, Morrinsville (NZ)

(73) Assignee: Evonik Degussa GmbH, Essen (DE)

( * ) Notice: Subject to any disclaimer, the term of this patent is extended or adjusted under 35 U.S.C. 154(b) by 0 days.

(21) Appl. No.: 14/345,637

(22) PCT Filed: Sep. 19, 2012

(86) PCT No.: PCT/EP2012/068387
§ 371 (c)(1),
(2) Date: Mar. 18, 2014

(87) PCT Pub. No.: WO2013/041544
PCT Pub. Date: Mar. 28, 2013

(65) Prior Publication Data
US 2014/0348740 A1  Nov. 27, 2014

(30) Foreign Application Priority Data
Sep. 21, 2011  (EP) ..................................... 11182096

(51) Int. Cl.
*B01J 14/00* (2006.01)
*B01J 19/00* (2006.01)
(Continued)

(52) U.S. Cl.
CPC . *C01B 15/08* (2013.01); *B01F 3/08* (2013.01); *B01F 5/0602* (2013.01); *B01F 15/06* (2013.01); *B01J 19/26* (2013.01); *B01F 2015/061* (2013.01); *B01J 2219/00761* (2013.01)

(58) Field of Classification Search
USPC .......... 423/513; 422/129, 201, 160, 161, 650, 422/651; 165/174
See application file for complete search history.

(56) References Cited

U.S. PATENT DOCUMENTS 1,985,902 A * 1/1935 Maedonald ................... 266/155
2,789,954 A   4/1957 Fell
(Continued)

FOREIGN PATENT DOCUMENTS

EP   2 075 230 A1   7/2009
WO   WO 92/07791 A1   5/1992
(Continued)

OTHER PUBLICATIONS

International Search Report for PCT/EP2012/068387 filed Sep. 19, 2012.
(Continued)

*Primary Examiner* — Timothy Vanoy
(74) *Attorney, Agent, or Firm* — Law Office of: Michael A. Sanzo, LLC

(57) ABSTRACT

A device for mixing and cooling two reactive liquids, comprising a bundle type heat exchanger with parallel tubes, a head space open to one end of all tubes, a first inlet to the head space for introducing a first liquid and a second inlet to the head space with a multitude of nozzles for introducing a second liquid, the nozzles being located within the head space and oriented to direct the introduced liquid transverse to the axis of the tubes of the tube bundle, is useful for making peroxomonosulphuric acid from 85 to 98% by weight sulphuric acid introduced into the first inlet of the device and 50 to 80% by weight aqueous hydrogen peroxide introduced into the second inlet of the device.

11 Claims, 1 Drawing Sheet

(51) Int. Cl.

| | | |
|---|---|---|
| *C01B 15/06* | (2006.01) | |
| *C01B 15/08* | (2006.01) | |
| *F28D 7/00* | (2006.01) | |
| *B01F 3/08* | (2006.01) | |
| *B01F 5/06* | (2006.01) | |
| *B01F 15/06* | (2006.01) | |
| *B01J 19/26* | (2006.01) | |

(56) References Cited

U.S. PATENT DOCUMENTS

| | | | |
|---|---|---|---|
| 3,644,296 A | 2/1972 | Bosch | |
| 5,141,731 A | 8/1992 | Meier et al. | |
| 5,304,360 A | 4/1994 | Lane et al. | |
| 5,439,663 A | 8/1995 | Manganaro et al. | |
| 5,879,653 A * | 3/1999 | Castrantas et al. | 423/513 |
| 6,368,570 B1 | 4/2002 | Dilber | |
| 6,818,142 B2 * | 11/2004 | Tufano et al. | 216/83 |
| 7,807,860 B2 * | 10/2010 | Colman et al. | 585/658 |
| 8,673,234 B2 * | 3/2014 | Yows et al. | 422/241 |
| 2010/0112094 A1 | 5/2010 | Yoshida et al. | |

FOREIGN PATENT DOCUMENTS

| | | |
|---|---|---|
| WO | WO 97/26215 A1 | 7/1997 |
| WO | WO 2013/041546 A1 | 3/2013 |

OTHER PUBLICATIONS

Written Opinion of the International Searching Authority for PCT/EP2012/068387 filed Sep. 19, 2012.
International Preliminary Report on Patentability for PCT/EP2012/068387 filed Sep. 19, 2012.
U.S. Appl. No. 14/345,641, filed Mar. 18, 2013, Stesel.
Office Action for copending U.S. Appl. No. 14/345,641, sent Dec. 22, 2014.
Response to Office Action of Dec. 22, 2014 for copending U.S. Appl. No. 14/345,641, filed Jan. 21, 2105.
Notice of Allowance for copending U.S. Appl. No. 14/345,641, mailed Feb. 3, 2015.

* cited by examiner

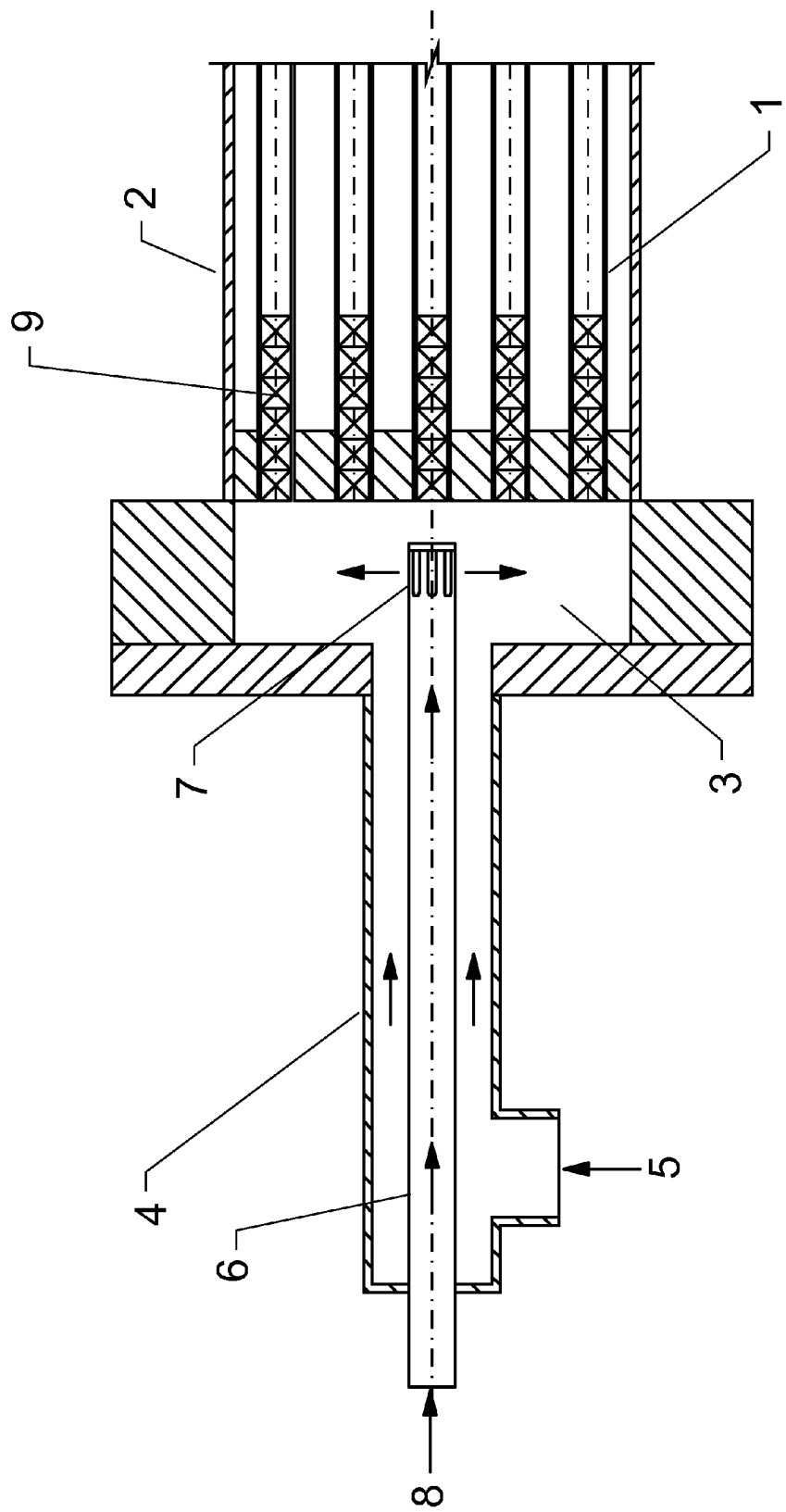

DEVICE FOR MIXING AND COOLING TWO REACTIVE LIQUIDS AND METHOD OF MAKING PEROXOMONOSULPHURIC ACID WITH THE DEVICE

CROSS REFERENCE TO RELATED APPLICATIONS

The present application is US national stage of international application PCT/EP2012/068387, which had an international filing date of Sep. 19, 2012 and which was published in English on Mar. 28, 2013. Priority is claimed to European application EP 11182096.5, filed on Sep. 21, 2011.

The invention relates to a device for mixing and cooling two reactive liquids and to a method of making peroxomonosulphuric acid with the device.

When two reactive liquids, such as sulphuric acid and hydrogen peroxide, are mixed to give a heat sensitive reaction product, such as peroxomonosulphuric acid, by an exothermic chemical reaction, a device is needed that efficiently mixes the reactive liquids and rapidly cools the resulting mixture.

U.S. Pat. No. 2,789,954 describes a method of making peroxomonosulphuric acid by flowing together a stream of concentrated sulphuric acid and a stream of hydrogen peroxide at the mouth of a water-cooled condenser, so that the resulting mixture is cooled within several seconds. The device used in U.S. Pat. No. 2,789,954 is useful only on a laboratory scale, but cannot be scaled up safely to an industrial scale.

U.S. Pat. No. 5,141,731 describes a method of making peroxomonosulphuric acid by adding a concentrated hydrogen peroxide to concentrated sulphuric acid in several portions using ejector/mixers for adding hydrogen peroxide streams to a stream of sulphuric acid. The mixture is cooled after every ejector/mixer in a heat exchanger, which can be of a shell and tube, a coil or a plate and frame design.

WO 92/07791 describes a method of making peroxomonosulphuric acid in an adiabatic reactor, where hydrogen peroxide is injected into a stream of sulphuric acid, flowing through an annular reaction chamber, through an inlet directing the hydrogen peroxide transversely to the sulphuric acid flow. The document further describes cooling the mixture, which exits the adiabatic reactor with a temperature of 80 to 110° C., to about 60° C. by passing it through a cooling unit.

However, there is still a need for a method of making peroxomonosulphuric acid that can be practiced on an industrial scale, uses less equipment than the method disclosed in U.S. Pat. No. 5,141,731 and avoids the exposure of peroxomonosulphuric acid to high temperatures where decomposition of peroxomonosulphuric acid may become so fast as to lead to a runaway reaction.

The instant inventors have found that the disadvantages of the prior art methods can be overcome by using a novel device for mixing and cooling two reactive liquids, which mixes the two liquids in the head space of a tube bundle type heat exchanger with suitably designed nozzles.

One object of the invention is a device for mixing and cooling two reactive liquids, comprising a bundle type heat exchanger which comprises a multitude of parallel tubes arranged in a common enclosure, a head space open to one end of all tubes of the tube bundle, a first inlet to the head space for introducing a first liquid and a second inlet to the head space with a multitude of nozzles for introducing a second liquid, said nozzles being located within the head space and oriented to direct the introduced liquid transverse to the axis of the tubes of the tube bundle.

A further object of the invention is a method for making peroxomonosulphuric acid, where 85 to 98% by weight sulphuric acid is introduced into the first inlet of a device according to the invention, 50 to 80% by weight aqueous hydrogen peroxide is introduced into the second inlet of said device and the resulting mixture is cooled in the tube bundle of said device.

FIG. 1 shows a preferred embodiment of the device of the invention having slot nozzles and additional static mixers located inside the tubes of the tube bundle.

The device of the invention comprises a tube bundle type heat exchanger which comprises a multitude of parallel tubes (1) arranged in a common enclosure (2). The tubes can be cooled by passing a cooling liquid through the space between the tubes and the common enclosure.

The device also comprises a head space (3) open to one end of all tubes of the tube bundle, which serves to distribute liquid to be cooled to the tubes of the tube bundle.

The device further comprises a first inlet (4) to the head space for introducing a first liquid (5) and a second inlet (6) to the head space with a multitude of nozzles (7) for introducing a second liquid (8). The nozzles (7) are located within the head space (3) and are oriented to direct the introduced liquid transverse to the axis of the tubes of the tube bundle. The nozzles (7) are preferably oriented to direct the introduced liquid at an angle essentially perpendicular to the axis of the tubes of the tube bundle. Introducing the second liquid through nozzles located within the head space (3) minimizes the time between mixing the liquids and cooling the liquids in tubes (1) of the heat exchanger. The specified orientation of the nozzles distributes the second liquid to all tubes (1) of the tube bundle.

The first and the second inlet are preferably coaxial with the tube bundle, the first inlet being an outer tube (4) connected to the head space and the second inlet being an inner tube (6) arranged within the outer tube and protruding into the head space (3). More preferably, the tube (6) of the second inlet is closed at the end located within the head space and the nozzles are slot nozzles (7) in the tube walls. Most preferably, the slots of the slot nozzles are in the direction of the tube of the second inlet. If slot nozzles are used, the total area of the slots of the slot nozzles (7) is preferably from 0.5 to 2.0 times the cross section area of the tube (6) of the second inlet. The coaxial arrangement of inlets and the use of slot nozzles provide even distribution of both reactive liquids to all tubes (1) of the tube bundle with a simple construction that can be manufactured from corrosion resistant materials at low cost.

In a preferred embodiment of the device of the invention additional static mixers (9) are located inside the tubes of the tube bundle at the end of the tubes open to the head space. In principle, all types of static mixers can be used. The additional static mixers improve mixing of the two reactive liquids and heat transfer from the mixture to the walls of the tubes (1) of the tube bundle.

The device of the invention is a modification of a standard tube bundle type heat exchanger that can be manufactured at low cost and is easy to maintain, as it contains no moving parts. The device of the invention can mix and cool two reactive liquids on a large scale with low residence time before cooling. The arrangement of nozzles in the device of the invention provides an even distribution of both reactive liquids to all tubes of the tube bundle without the need of a manifold for liquid distribution.

In the method of the invention for making peroxomonosulphuric acid, 85 to 98% by weight sulphuric acid is introduced into the first inlet of a device of the invention, as described above, 50 to 80% by weight aqueous hydrogen peroxide is introduced into the second inlet of said device and the resulting mixture is cooled in the tube bundle of said device. Sulphuric acid and hydrogen peroxide are preferably introduced at a molar ratio of from 0.5 to 10, more preferably at a molar ratio of from 0.5 to 5 and most preferably at a molar ratio of from 1 to 4. A molar ratio at the upper end of the ranges is preferred if high conversion of hydrogen peroxide is desired. A molar ratio at the lower end of the ranges is preferred if the resulting peroxomonosulphuric acid solution will be neutralized with a base before use.

Sulphuric acid and hydrogen peroxide are preferably introduced at flow rates providing an average residence time in the head space of less than 10 seconds, more preferably less than 7 seconds and most preferably less than 5 seconds, the average residence time being calculated as the ratio between the volume of the head space and the combined flow rates of sulphuric acid and hydrogen peroxide. The average residence time in the head space is preferably more than 1 second. A low residence time in the head space of the heat exchangers can lower the maximum temperature reached by the reaction mixture and leads to less peroxide decomposition in the process.

The mixture resulting from mixing sulphuric acid and hydrogen peroxide in the head space of the heat exchanger is preferably cooled in the tube bundle to a temperature of less than 80° C., preferably less than 50° C. and most preferably less than 40° C. The mixture is preferably cooled to a temperature of at least 27° C., more preferably at least 35° C. Low temperatures are preferred if the peroxomonosulphuric acid solution is to be stored, whereas higher temperatures can be used to lower coolant consumption if the peroxomonosulphuric acid solution is used within a short time. The mixture is preferably cooled using cooling water as the coolant.

The method of the invention for making peroxomonosulphuric acid requires less complicated equipment than prior art methods and can be operated safely on a large scale with high yields, because it avoids exposing peroxomonosulphuric acid and non-reacted hydrogen peroxide to high temperatures that lead to peroxide decomposition.

The invention claimed is:

1. A device for mixing and cooling two reactive liquids, comprising a bundle type heat exchanger, said heat exchanger comprising a multitude of parallel tubes arranged in a common enclosure, a head space open to one end of all tubes of the tube bundle, and a first inlet to the head space for introducing a first liquid, wherein the device comprises a second inlet to the head space with a multitude of nozzles for introducing a second liquid, said nozzles being located within the head space and oriented to direct the introduced liquid transverse to the axis of the tubes of the tube bundle.

2. The device of claim 1, wherein said nozzles are oriented to direct the introduced liquid at an angle essentially perpendicular to the axis of the tubes of the tube bundle.

3. The device of claim 1, wherein the first and the second inlet are coaxial with the tube bundle, the first inlet is an outer tube connected to the head space and the second inlet is an inner tube arranged within the outer tube and protruding into the head space.

4. The device of claim 1, wherein the second inlet is a tube protruding into the head space, the tube being closed at the end located within the head space, and the nozzles are slot nozzles in the tube walls.

5. The device of claim 4, wherein the slots of said slot nozzles are in the direction of the tube of the second inlet.

6. The device of claim 4, wherein the total area of the slots of said slot nozzles is from 0.5 to 2.0 times the cross section area of the tube of the second inlet.

7. The device of claim 1, wherein static mixers are located inside the tubes of the tube bundle at the end of the tubes open to the head space.

8. A method for making peroxomonosulphuric acid, wherein 85 to 98% by weight sulphuric acid is introduced into the first inlet of a device according to claim 1, 50 to 80% by weight aqueous hydrogen peroxide is introduced into the second inlet of said device and the resulting mixture is cooled in the tube bundle of said device.

9. The method of claim 8, wherein sulphuric acid and hydrogen peroxide are introduced at a molar ratio of from 0.5 to 10.

10. The method of claim 8, wherein sulphuric acid and hydrogen peroxide are introduced at flow rates providing an average residence time in the head space of less than 10 seconds, the average residence time being calculated as the ratio between the volume of the head space and the combined flow rates of sulphuric acid and hydrogen peroxide.

11. The method of claim 8, wherein said resulting mixture is cooled to a temperature of less than 80° C.

* * * * *